US012621723B2

(12) United States Patent
Jamkhandikar et al.

(10) Patent No.: US 12,621,723 B2
(45) Date of Patent: May 5, 2026

(54) INTER VIRTUAL-ENODEB OPTIMIZED HANDOVER FOR GATEWAY CORE NETWORK (GWCN)

(71) Applicant: Parallel Wireless, Inc., Nashua, NH (US)

(72) Inventors: Sunil Jamkhandikar, Pune (IN); Ravikiran Raje, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 111 days.

(21) Appl. No.: 17/499,276

(22) Filed: Oct. 12, 2021

(65) Prior Publication Data

US 2022/0116832 A1 Apr. 14, 2022

Related U.S. Application Data

(60) Provisional application No. 63/089,844, filed on Oct. 9, 2020.

(51) Int. Cl.
*H04W 36/00* (2009.01)
*H04W 36/08* (2009.01)

(52) U.S. Cl.
CPC ........ *H04W 36/0033* (2013.01); *H04W 36/08* (2013.01)

(58) Field of Classification Search
CPC ............. H04W 36/0055; H04W 36/08; H04W 36/0066; H04W 36/0033; H04W 36/32; H04W 36/0061; H04W 36/0011; H04W 36/38; H04W 36/0077; H04W 36/00835; H04W 36/24
See application file for complete search history.

(56) References Cited

U.S. PATENT DOCUMENTS

| | | | |
|---|---|---|---|
| 8,792,941 B2 | 7/2014 | Panchal | |
| 8,982,841 B2 | 3/2015 | Srinivasan | |
| 10,028,132 B2 | 7/2018 | Choi et al. | |
| 10,986,691 B2 | 4/2021 | Cao et al. | |
| 11,026,136 B2 | 6/2021 | Raval et al. | |
| 11,653,278 B2 | 5/2023 | Agarwal et al. | |
| 11,665,597 B2 | 5/2023 | Gupta et al. | |
| 2012/0099562 A1* | 4/2012 | Smadi ............... | H04W 36/0085 370/332 |

(Continued)

FOREIGN PATENT DOCUMENTS

| | | |
|---|---|---|
| CN | 105052232 A | 11/2015 |
| CN | 107852776 B | 9/2021 |

(Continued)

*Primary Examiner* — Allahyar Kasraian
(74) *Attorney, Agent, or Firm* — Michael Y. Saji; Ashish Patel

(57) ABSTRACT

Methods, systems and computer readable media are disclosed for providing inter virtual-eNodeB optimized handover. In one example embodiment, a method includes sending, from a first eNodeB, a handover required message to a first HetNet Gateway (HNG)/virtual eNodeB; matching a target cell in a virtual eNodeB database; receiving, at a second eNodeB, a handover request from a second HNG/virtual eNodeB; sending, by the second eNodeB, a handover request acknowledge message to the second HNG/virtual eNodeB; and performing call context switching using the virtual eNodeB database.

20 Claims, 5 Drawing Sheets

(56)                       References Cited

U.S. PATENT DOCUMENTS

Figure 1:
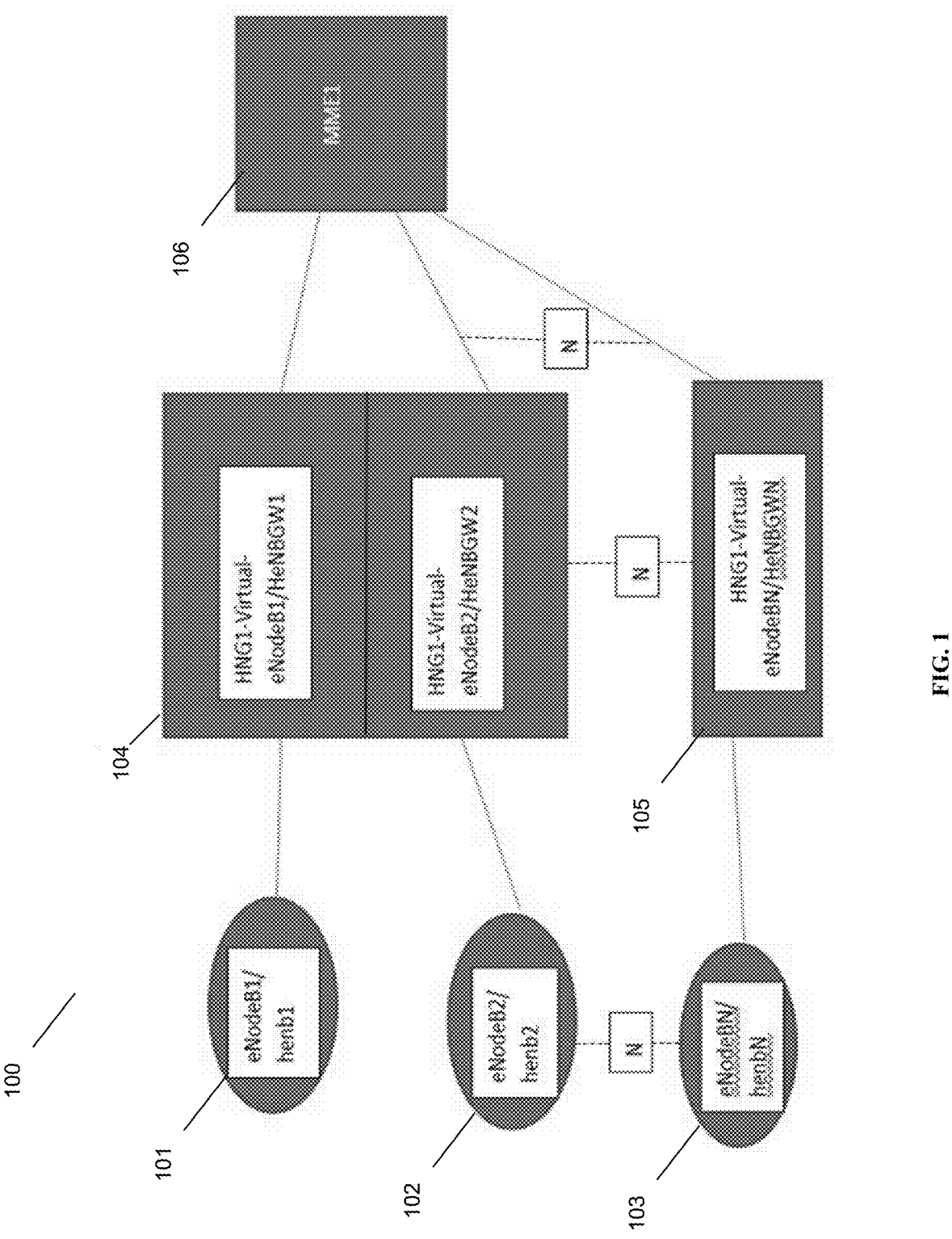

2012/0182970  A1*    7/2012  Ding ..................... H04W 36/14
                                                                        370/331
2013/0294403  A1*  11/2013  Srinivasan ........... H04W 88/12
                                                                        370/328
2014/0321430  A1*  10/2014  Bakker ............. H04W 36/0033
                                                                        370/331
2017/0280363  A1*    9/2017  Tenny ............... H04W 36/0069
2018/0035334  A1*    2/2018  Lohar .................. H04W 24/02
2018/0041934  A1*    2/2018  Agarwal .............. H04W 76/27
2018/0213441  A1*    7/2018  Mehta ................ H04W 28/082
2019/0297540  A1*    9/2019  Das ...................... H04W 76/10
2021/0227405  A1*    7/2021  Mishra ................ H04W 24/02
2023/0300684  A1      9/2023  Gupta et al.

FOREIGN PATENT DOCUMENTS

EP                3104639  B1      8/2018
EP                3430731  B1      2/2021
EP                3520316  B1      3/2022
EP                3968675  A1      3/2022
KR        20170107485  A      4/2019
KR        20170127536  A    12/2019

* cited by examiner

INTER VIRTUAL-ENODEB OPTIMIZED HANDOVER FOR GATEWAY CORE NETWORK (GWCN)

CROSS-REFERENCE TO RELATED APPLICATIONS

This application claims priority under 35 U.S.C. § 119(e) to U.S. Provisional Pat. App. No. 63/089,844, filed Oct. 9, 2020, titled "Inter Virtual-eNodeB Optimized Handover for Gateway Core Network (GWCN)" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804, 209, "5G Native Architecture," filed Feb. 11, 2019.

BACKGROUND

In cellular networks, base stations have a limited reach, to achieve connectivity between mobile devices—which may be mobile—handover is necessary. Handover or hand off is a process in telecommunication and mobile communication in which cellular transmission (voice or data) is transferred from one base station (cell site) to another without losing connectivity to the cellular transmission. Handover is a core element in deploying mobile transmission as it creates data sessions or connects phone calls between mobile devices which are constantly on the move. Existing handover procedures are defined by 3GPP spec 36.413.

One type of handover is one in which the channel source cell is released before the channel in the target is engaged. In this type of handover, the connection to the source is broken just before or along with when the connection to the target is made. It is also called break before making handover.

Another type of handover is one in which the source cell is retained and works in parallel with the target cell for a while. In this case, connection to the target cell is established before connection to the source is broken. This type of handover allows a parallel connection between several channels to provide better service. It is very effective in areas with poor coverage.

Another type of handover is an inter virtual eNodeB handover. There type of handovers can cause increased signaling as well as processing overload on the MME in case of hEnB attached to separate virtual eNodeB's of the HNG solution, or ENodeB's attached to separate virtual ENodeB's of the HNG solution.

SUMMARY

This handover problem can be addressed by optimizing the handover within the HNG solution so that the handover signaling load is not transferred to MME, as well as the need for processing the handovers and finding the target either using Target eNbid or TAC based routing for higher release MMEs. (We can be independent instead of relying on MME to support TAC based routing.) The task of searching for Target eNb IDs especially in case of home-eNbs with non-matching eNbids behind the hEnBw, would mean that MME needs capability to do TAC based handover and increases the processing load per handover (decreases signaling load significantly).

In one example embodiment a method for providing inter virtual-eNodeB optimized handover, includes sending, from a first eNodeB, a handover required message to a first HetNet Gateway (HNG)/virtual eNodeB; matching a target cell in a virtual eNodeB database; receiving, at a second eNodeB, a handover request from a second HNG/virtual eNodeB; sending, by the second eNodeB, a handover request acknowledge message to the second HNG/virtual eNodeB; and performing call context switching using the virtual eNodeB database.

In another example embodiment a system for providing inter virtual-eNodeB optimized handover includes a first eNodeB; a first HetNet Gateway (HNG)/virtual eNodeB in communication with the first eNodeB; a second eNodeB; and a second HetNet Gateway (HNG)/virtual eNodeB in communication with the second eNodeB. The first eNodeB sends a handover required message to the first HetNet Gateway (HNG)/virtual eNodeB; a target cell is matched in a virtual eNodeB database; the second eNodeB receives a handover request from the second HNG/virtual eNodeB; the second eNodeB sends a handover request acknowledge message to the second HNG/virtual eNodeB; and call context switching is performed using the virtual eNodeB database.

In another example embodiment a non-transitory computer-readable medium contain instructions for providing inter virtual-eNodeB optimized handover which, when executed, cause a system to perform steps comprising: sending, from a first eNodeB, a handover required message to a first HetNet Gateway (HNG)/virtual eNodeB; matching a target cell in a virtual eNodeB database; receiving, at a second eNodeB, a handover request from a second HNG/virtual eNodeB; sending, by the second eNodeB, a handover request acknowledge message to the second HNG/virtual eNodeB; and performing call context switching using the virtual eNodeB database.

DETAILED DESCRIPTION

The described solution will help handle the handovers within the HNG solution, so that the only signal of the handover which will be sent to the MME would be a path switch request.

The solution also proposes to reduce inter virtual eNodeB signaling by switching the call context directly within the same HNG solution using a data-base of the virtual eNodeB (Venb DB), so that the s1 signaling is not exchanged within the two virtual ENodeBs. (Venb1 knows the target is connected to diff VenB in same HNG)

This will also avoid our internal S1-X2 HO implementation (where we use HNG sends proprietary Handover Type other to CWS. This helps VenB processing load based on Handover Type)

The solution further proposes that as long as the MME connected to the two virtual ENodeB's is the same and is handling Multiple Plmns for Gateway Core Network, then such inter-plmn handovers too can be handled within the HNG solution in the same manner.

We save the IP addresses requirement (X2 Ip pool)

We also can cater HenB's connected to Venb's with different ECGI's (Dependency on MME TAC based routing can be avoided)

This will work in Cloud Native environment, container based or VM based micro services which are deployed across cloud network/Host.

Architecture Diagram

FIG. 1 shows block reference setup diagram. The system 100 includes a first eNodeB 101, a second eNodeB 102 and more enodeBs 103. One or more of the enodeBs may be in communication with Hetnet Gateway (HNG)/virtual nodeB 104 which also includes another virtual enodeB. A second Hetnet Gateway (HNG)/virtual nodeB 105 is also shown, in communication with one or more enodeBs 103. Mobility Management Entity (MME) 106 is in communication with HNG/virtual eNodeBs 104 and 105.

Figure 2:
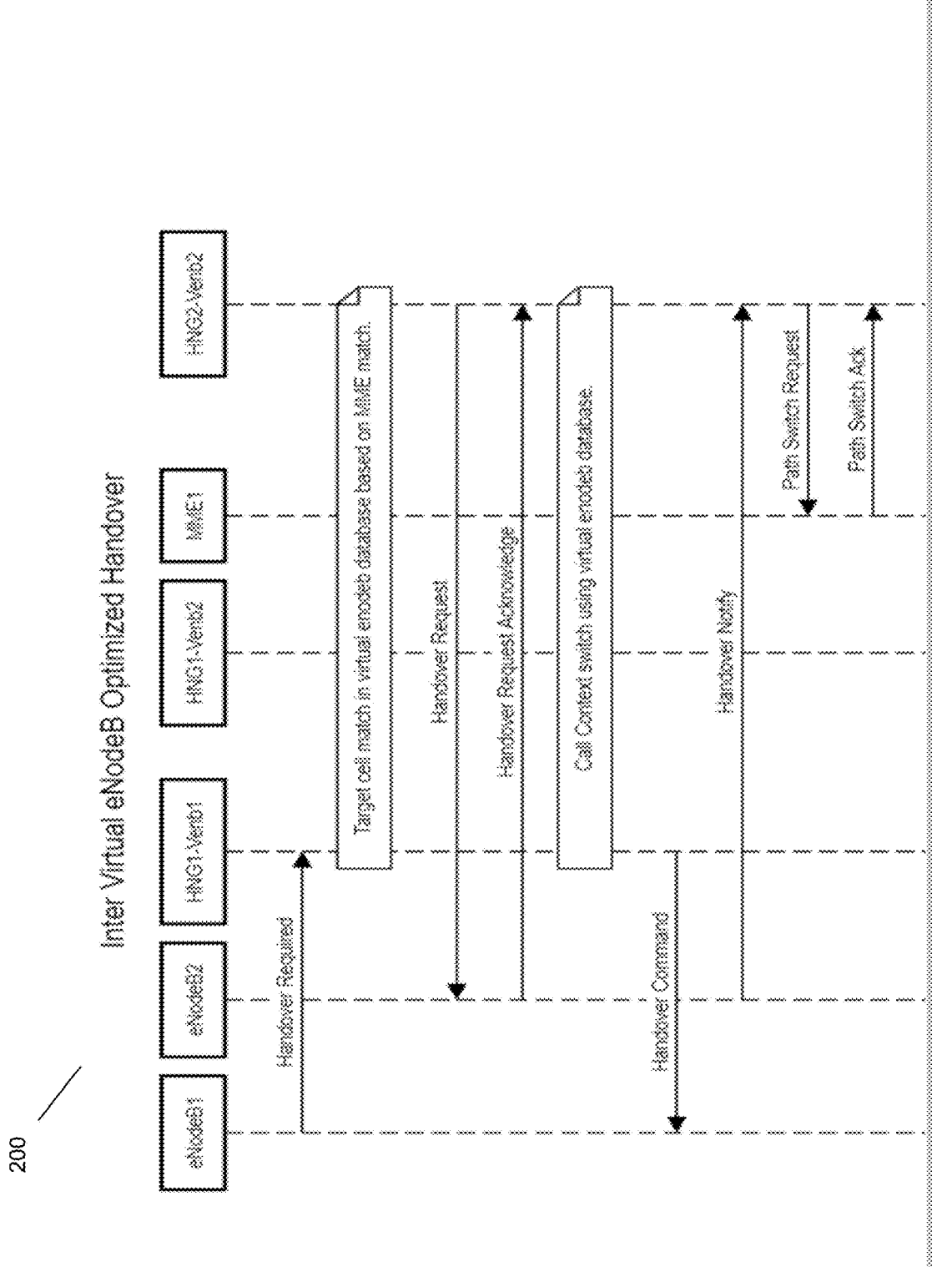

FIG. 2 is a call flow diagram 200 for inter-virtual eNodeB optimized handover. The system for providing inter virtual-eNodeB optimized handover includes a first eNodeB, a first HetNet Gateway (HNG)/virtual eNodeB in communication with the first eNodeB, a second eNodeB, and a second HetNet Gateway (HNG)/virtual eNodeB in communication with the second eNodeB. In operation, the first eNodeB sends a handover required message to the first HetNet Gateway (HNG)/virtual eNodeB, and a target cell is matched in a virtual eNodeB database. The target cell match is based on a Mobility Management Entity (MME) match. The second eNodeB receives a handover request from the second HNG/virtual eNodeB and the second eNodeB sends a handover request acknowledge message to the second HNG/virtual eNodeB. Call context switching is performed using the virtual eNodeB database.

The first HNG/virtual eNodeB sends a handover command to the first eNodeB. The second eNodeB sends a handover notify message to the second HNG/virtual eNodeB.

A Mobility Management Entity (MME) in communication with the second HNG/virtual eNodeB. The second HNG/virtual eNodeB sends a path switch release message to the MME. The MME sends a path switch acknowledge message to the second HNG/virtual eNodeB.

Figure 3:
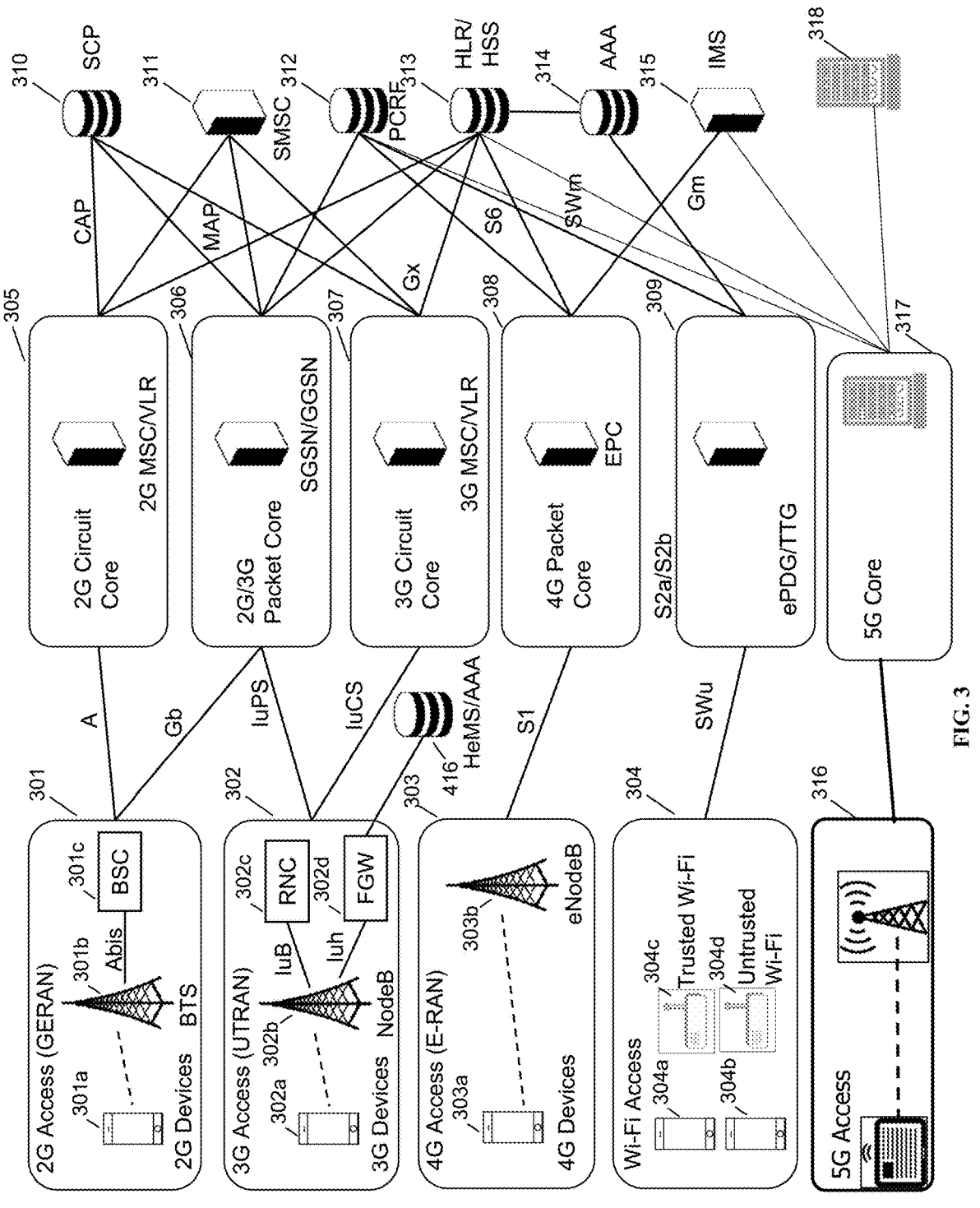

FIG. 3 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
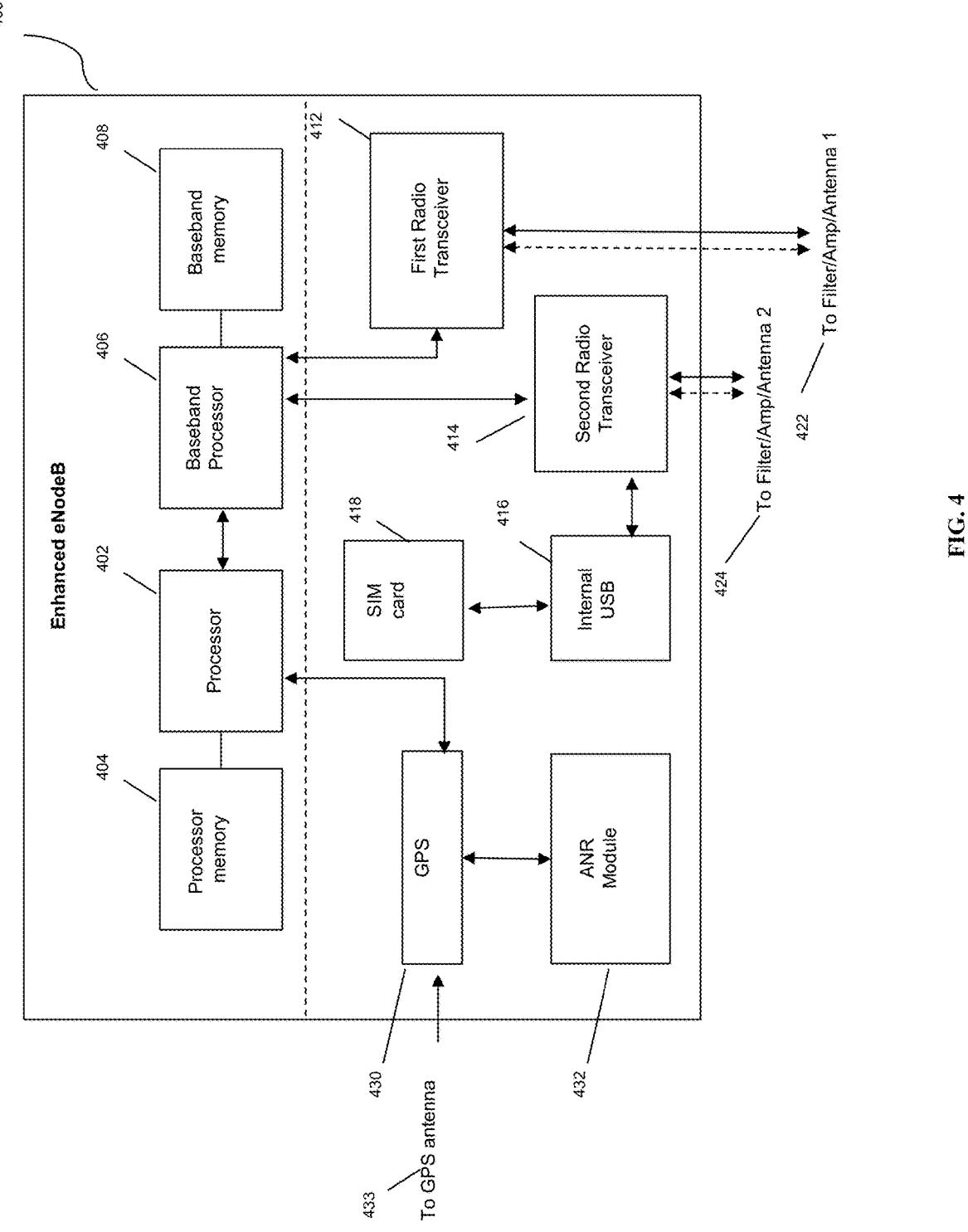

FIG. 4 is a block diagram of an enhanced eNodeB for performing the methods described herein, in accordance with some embodiments. eNodeB 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
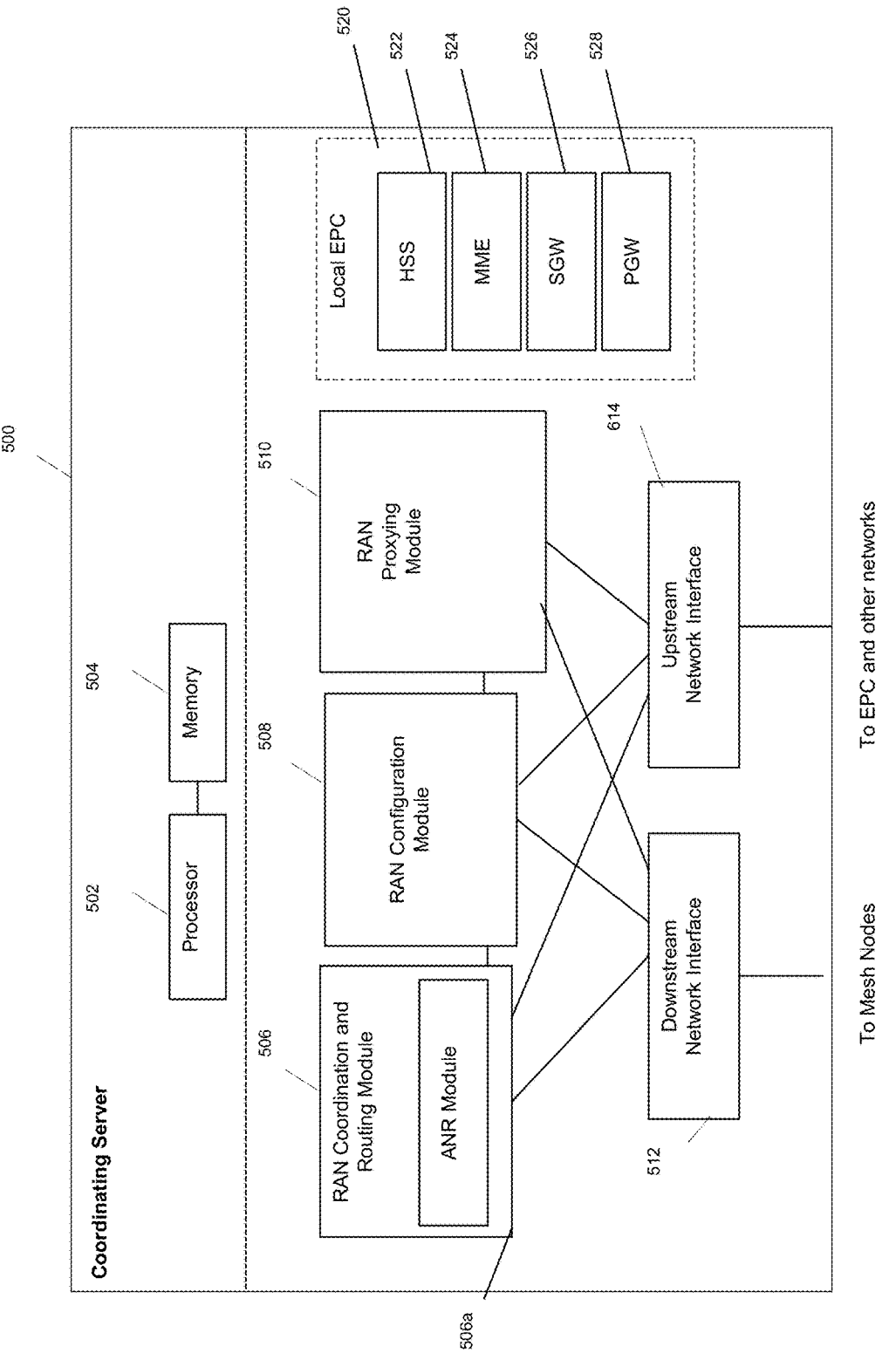

FIG. 5 is a block diagram of a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing inter virtual-eNodeB optimized handover, comprising:
   receiving, from a first eNodeB at a first HetNet Gateway (HNG)/virtual eNodeB, a handover required message for a handover for a user equipment (UE) from the first eNodeB to a target eNodeB;
   matching, via the first HNG/virtual eNodeB, the target eNodeB in a virtual eNodeB database to a second HNG/virtual eNodeB;
   wherein the target eNodeB receives from the second HNG/virtual eNodeB, based on the handover required message, a handover request message;
   sending, from the first HNG/virtual eNodeB to the first eNodeB, based on the handover request message, a handover command message to handover to the second eNodeB, wherein the second eNodeB is the target eNodeB;
   wherein the target eNodeB sends to the second HNG/virtual eNodeB, based on the handover request message, a handover request acknowledge message; and
   performing call context switching for the UE between a virtualization of the first eNodeB in the first HNG/virtual eNodeB and a virtualization of the second eNodeB in the first HNG/virtual eNodeB without exchanging signaling based on the matching and the handover request message.

2. The method of claim 1 wherein the matching is based on a Mobility Management Entity (MME) match.

3. The method of claim 2 further comprising, by the first HNG/virtual eNodeB, avoiding exchanging of S1 signaling between the virtualization of the first eNodeB and the virtualization of the second eNodeB.

4. The method of claim 1 wherein the second eNodeB sends a handover notify message to the second HNG/virtual eNodeB.

5. The method of claim 1 wherein the second HNG/virtual eNodeB sends a path switch release message to the MME, the path switch release message being the only signaling for the handover sent to the MME.

6. The method of claim 5 wherein the MME sends a path switch acknowledge message to the second HNG/virtual eNodeB.

7. The method of claim 1, wherein the virtualization of the first eNodeB and the virtualization of the second eNodeB are in the first HNG.

8. The method of claim 1, wherein matching further comprises determining by the virtualization of the first eNodeB that the target cell is connected to the virtualization of the second eNodeB in the same HNG.

9. A system for providing inter virtual-eNodeB optimized handover, comprising:
   a first HetNet Gateway (HNG)/virtual eNodeB, including a processor and a memory, in communication with a first eNodeB in a cellular core network,
   a second eNodeB in communication with the first eNodeB via the cellular core network, and a virtual eNodeB database,
   wherein a second HetNet Gateway (HNG)/virtual eNodeB is in communication with the second eNodeB, and the first HNG/virtual eNodeB;
   wherein the processor is configured to:
      receive, from the first eNodeB, a handover required message for a handover for a user equipment (UE) from the first eNodeB to a target eNodeB;
      match the target eNodeB in the virtual eNodeB database to the second HNG/virtual eNodeB;
      send to the first eNodeB, based on the handover request message, a handover command message to handover to the second eNodeB, wherein the second eNodeB is the target eNodeB; and
      perform call context switching for the UE between a virtualization of the first eNodeB in the first HNG/virtual eNodeB and a virtualization of the second eNodeB in the first HNG/virtual eNodeB without exchanging signaling based on the match and the handover request message;
      wherein the target eNodeB receives from the second HNG/virtual eNodeB, based on the handover required message, a handover request message; and
      wherein the target eNodeB sends to the second HNG/virtual eNodeB, based on the handover request message, a handover request acknowledge message.

10. The system of claim 9 wherein match is based on a Mobility Management Entity (MME) match.

11. The system of claim 10 wherein the processor is further configured to avoid exchanging of SI signaling between the virtualization of the first eNodeB and the virtualization of the second eNodeB.

12. The system of claim 9 wherein the second eNodeB sends a handover notify message to the second HNG/virtual eNodeB.

13. The system of claim 9 wherein a Mobility Management Entity (MME) is in communication with the second HNG/virtual eNodeB and wherein the second HNG/virtual eNodeB sends a path switch release message to the MME, the path switch release message being the only signaling for the handover sent to the MME.

14. The system of claim 13 wherein the MME sends a path switch acknowledge message to the second HNG/virtual eNodeB.

15. A non-transitory computer-readable medium containing instructions for providing inter virtual-eNodeB optimized handover which, when executed, cause a system to perform steps comprising:
   receiving, from a first eNodeB at a first HetNet Gateway (HNG)/virtual eNodeB, a handover required message for a handover for a user equipment (UE) from the first eNodeB to a target eNodeB;
   matching, via the first HNG/virtual eNodeB, the target eNodeB in a virtual eNodeB database to a second HNG/virtual eNodeB;
   wherein the eNodeB receives from the second HNG/virtual eNodeB, based on the handover required message, a handover request message;

sending, from the first HNG/virtual eNodeB to the first eNodeB, based on the handover request message, a handover command message to handover to the second eNodeB, wherein the second eNodeB is the target eNodeB;

wherein the target eNodeB sends to the second HNG/virtual eNodeB, based on the handover request message, a handover request acknowledge message; and performing call context switching for the UE between a virtualization of the first eNodeB in the first HNG/virtual eNodeB and a virtualization of the second eNodeB in the first HNG/virtual eNodeB without exchanging signaling based on the matching and the handover request message.

16. The computer-readable medium of claim 15 wherein the matching is based on a Mobility Management Entity (MME) match.

17. The computer-readable medium of claim 16 further comprising instructions for, by the first HNG/virtual eNodeB, avoiding exchanging of S1 signaling between the virtualization of the first eNodeB and the virtualization of the second eNodeB.

18. The computer-readable medium of claim 15 wherein the second eNodeB sends a handover notify message to the second HNG/virtual eNodeB.

19. The computer-readable medium of claim 15 wherein the second HNG/virtual eNodeB sends a path switch release message to the MME, the path switch release message being the only signaling for the handover sent to the MME.

20. The computer-readable medium of claim 19 wherein the MME sends a path switch acknowledge message to the second HNG/virtual eNodeB.

* * * * *